US010623888B2

(12) United States Patent
Shrinath

(10) Patent No.: US 10,623,888 B2
(45) Date of Patent: Apr. 14, 2020

(54) COMPUTING SYSTEM WITH CROWD PREDICTION MECHANISM AND METHOD OF OPERATION THEREOF

(71) Applicant: Telenav, Inc., Sunnyvale, CA (US)

(72) Inventor: Arjun Shrinath, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 587 days.

(21) Appl. No.: 14/639,723

(22) Filed: Mar. 5, 2015

(65) Prior Publication Data

US 2016/0261984 A1 Sep. 8, 2016

(51) Int. Cl.
*H04W 4/02* (2018.01)
*G06F 19/00* (2018.01)
*H04W 4/021* (2018.01)

(52) U.S. Cl.
CPC ............ *H04W 4/021* (2013.01); *H04W 4/023* (2013.01)

(58) Field of Classification Search
CPC ....... H04W 4/021; H04W 4/023; G01B 21/00
See application file for complete search history.

(56) References Cited

U.S. PATENT DOCUMENTS

| | | | | |
|---|---|---|---|---|
| 8,332,132 | B2* | 12/2012 | Groenhuijzen | G01C 21/3415 340/995.13 |
| 8,487,762 | B1* | 7/2013 | McMullen | H04W 4/021 340/541 |
| 9,148,754 | B2* | 9/2015 | Vanderwater | H04W 4/02 |
| 2014/0184795 | A1 | 7/2014 | Miller et al. | |
| 2015/0057025 | A1* | 2/2015 | Malik | H04W 64/00 455/456.3 |
| 2015/0271636 | A1* | 9/2015 | Dempski | H04L 67/306 455/456.3 |
| 2016/0019465 | A1* | 1/2016 | Milton | H04W 4/029 706/52 |

\* cited by examiner

*Primary Examiner* — Ajay Ojha
(74) *Attorney, Agent, or Firm* — Perspectives Law Group, Corp.

(57) ABSTRACT

A method of operation of a computing system includes: determining a member location set for representing one or more member; calculating a current-occupancy based on the member location set for representing the one or more member located at a relevant area; and calculating an occupant density based on the current-occupancy with a control unit for representing the occupant density corresponding to the relevant area.

19 Claims, 6 Drawing Sheets

COMPUTING SYSTEM WITH CROWD PREDICTION MECHANISM AND METHOD OF OPERATION THEREOF

TECHNICAL FIELD

An embodiment of the present invention relates generally to a computing system, and more particularly to a system with a crowd mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding information regarding groups of people and other users. The possible applications for locating the device have yet been fully utilized.

Thus, a need still remains for a computing system with a crowd mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a computing system including: determining a member location set for representing one or more member; calculating a current-occupancy based on the member location set for representing the one or more member located at a relevant area; and calculating an occupant density based on the current-occupancy with a control unit for representing the occupant density corresponding to the relevant area.

An embodiment of the present invention provides a computing system, including: a communication unit configured to communicate a location indicator for representing one or more member; a control unit, coupled to the communication unit, configured to: determine a member location set for representing one or more member, calculate a current-occupancy based on the member location set for representing the one or more member located at a relevant area, and calculate an occupant density based on the current-occupancy for representing the occupant density corresponding to the relevant area.

An embodiment of the present invention provides a non-transitory computer readable medium including instructions for a computing system, including: determining a member location set for representing one or more member; calculating a current-occupancy based on the member location set for representing the one or more member located at a relevant area; and calculating an occupant density based on the current-occupancy for representing the occupant density corresponding to the relevant area.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
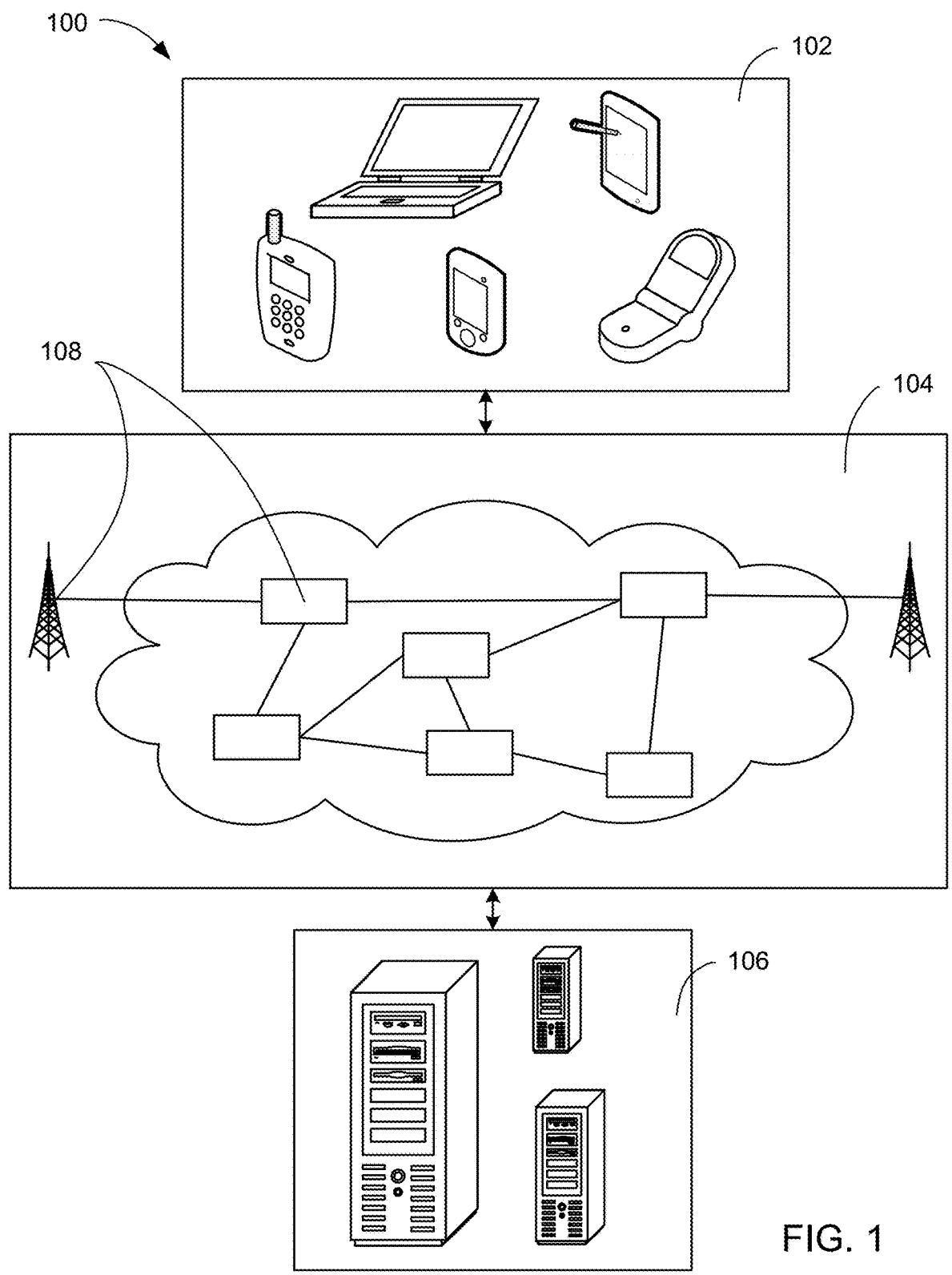
FIG. 1 is a computing system with a crowd mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a computing system 100 with a crowd mechanism in an embodiment of the present invention. The computing system 100, including a navigation system for searching or providing guidance associated with geographic locations, can include a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a stand-alone device. The first device 102 further be separate form or incorporated with a vehicle, such as a car, truck, bus, or train.

For illustrative purposes, the computing system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the network 104, although it is understood that the computing system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The network 104 can include one or more instances of a communication portal 108. The communication portal 108 can include a device for interfacing with the first device 102 for accessing the network 104. For example, the communication portal 108 can include a router, a repeater, a base station, a gateway, a server, or a combination thereof. The first device 102 can interface with the communication portal 108 for utilizing the network 104 to communicate with the second device 106.

For illustrative purposes, the computing system 100 will be described as communicating messages from the first device 102 to the second device 106 using one or more instances of the communication portal 108 in the network 104, and with the second device 106 communicating back to the first device 102 in response thereto. However, it is understood that the devices can communicate in any order.

Figure 2:
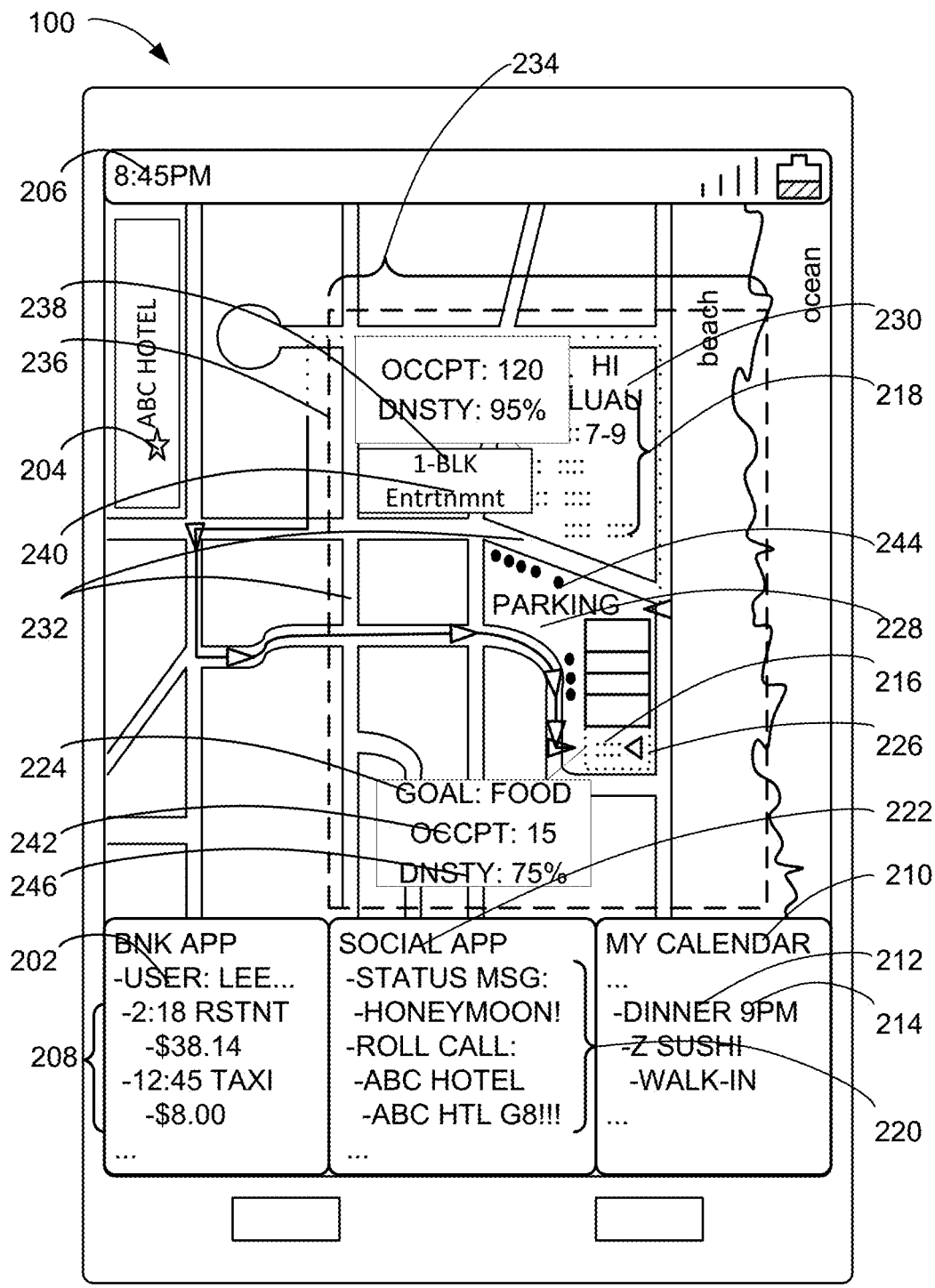
FIG. 2 is an example of a display interface of the first device of FIG. 1.

Referring now to FIG. 2, therein is shown example of a display interface of the first device 102 of FIG. 1. The computing system 100 of FIG. 1 can interact with a user 202. The user 202 can access capabilities or functions of the computing system 100 with the first device 102, the second device 106 of FIG. 1, the communication portal 108 of FIG. 1, the network 104 of FIG. 1, or a combination thereof.

For illustrative purposes, the user 202 will be described as owning, directly interfacing with, physically interacting with, or a combination thereof with respect to the first device 102. The first device 102 can access or interact with the second device 106 through the communication portal 108, the network 104, or a combination thereof. However, it is understood that the user 202 can directly access or physically interact with the second device 106, access the first device 102 based on directly accessing or physically interacting with the second device 106 or a further device, or a combination thereof.

The computing system 100 can determine a current location 204 associated with a current time 206. The current location 204 can include a description for finding or accessing a person, an item, a place, an entity, information, data, or a combination thereof.

For example, the current location 204 can include a coordinate, a name, an address, a marker, or a combination thereof representing a geographical location of the person, the item, the entity, or a combination thereof at the current time 206. Also for example, the current location 204 can include a classification, a type, a progress level, or a combination thereof associated with the geographical location of the user at the current time 206.

The computing system 100 can process a transaction record 208 for the user 202. The transaction record 208 can include a record of financial transaction for the user 202. The computing system 100 can process the transaction record 208 based on accessing financial records of the user 202, such as through an application or based on communicating with a financial institution.

The computing system 100 can further process the transaction record 208 based on facilitating or recording a monetary payment to or from the user 202. For example, the user can pay or receive payments based on authorizations provided through the first device 102, interfacing with a financial or banking application on the first device 102, or a combination thereof.

The computing system 100 can include a schedule calendar 210 for the user 202. The schedule calendar 210 can include one or more calendar event 212 associated with time or date. The schedule calendar 210 can include title, time, location, additional description, category, duration, route, participant, contact information, reminder, or a combination thereof for the calendar event 212.

The calendar event 212 can include an occasion, an occurrence, a goal, a significance, a representation or a reminder thereof, or a combination thereof associated with the user 202. The calendar event 212 can occur at past time, the current time 206, or future time 214 after or later than the current time 206.

The computing system 100 can process information associated one or more members 216. The members 216 can include one or more persons or entities targeted and processed by the computing system 100. The members 216 can include people utilizing or interacting with the computing system 100.

For illustrative purposes, the members 216 will be described as people other than the user 202 interacting with the computing system 100. However, it is understood that the members 216 can include all people interacting with the computing system 100 or a smaller distinct subset thereof, including the user 202. Also, it is understood that the members 216 can be singular member and represent one other person apart from the user 202.

Each of the members 216 can be similar to the user 202. For example, the computing system 100 can process the current location 204, the transaction record 208, the schedule calendar 210, or a combination thereof for, associated with, or representing each of the members 216. As a more specific example, the computing system 100 can determine a member location set 218.

The member location set 218 can represent a grouping of people relative to geographic areas. The member location set 218 can include a collection of the current location 204 for the members 216. The member location set 218 can be for identifying the members 216 located within a predetermined region, within a geofence, satisfying certain conditions, or a combination thereof. The member location set 218 can include coordinates, categories, identifiers, addresses, or a combination thereof representing each of the members 216.

For example, the member location set 218 can include coordinates, address, or a combination thereof representing the current location 204 of each of the members 216. Also for example, the member location set 218 can include a name or identification of establishment, region, structure, or a combination thereof physically including the current location 204. Also for example, the member location set 218 can include a name or identification of an event, a group, or a cause associated with the current location 204 or current participation of the user 202.

The computing system 100 can process location information for the user 202, the members 216, or a combination thereof in a variety of ways. The computing system 100 can identify and process location indicator 220. The location indicator 220 can include information indicating the location of the user 202, the member 216, or a combination thereof. The location indicator 220 can include information locating the user 202, the member 216, or a combination thereof at the current time 206, the future time 214, in the past, or a combination thereof. The computing system 100 can determine the current location 204 based on the location indicator 220.

For example, the location indicator 220 can include a Global Positioning System (GPS) coordinate, an address, a latitude and longitude, or a combination thereof representing location of one or more devices of the user 202, the member 216, or a combination thereof. As a more specific example, the location indicator 220 can be location information from the first device 102, the second device 106, or a combination thereof associated with, belonging to, on the person of, used by, or a combination thereof for the user 202, the member 216, or a combination thereof.

Also for example, the location indicator 220 can include a route request, a reroute request, a result of triangulation process with cell towers, a result of deadpan or GPS tracking, a connection to another device, such as a router or another user device, or a combination thereof. Also for example, the location indicator 220 can include a content submitted by the user 202, the member 216, or a combination thereof indicating the location of the user 202, the member 216, or a combination thereof.

As a more specific example, the location indicator 220 can include users checking in at an establishment, key words identifying locations, such as address or names of businesses, locations from the calendar event 212, the transaction record 208 associated with the establishment or the business, or a combination thereof. The computing system 100 can determine or receive the location indicator 220 based on communications, such as email or text messages, the schedule calendar 210, the transaction record 208, a social media 222, or a combination thereof corresponding to or associated with the user 202, the member 216, or a combination thereof.

The social media 222 is a service, a website, or a combination thereof including computer-mediated tools that allow people to create, share, or exchange information in virtual communities or networks. The social media 222 can include personal information, content from or shared by, personal connections or social networks, status of, or a combination thereof regarding the user 202, the member 216, or a combination thereof. For example, the social media 222 can include Facebook™, Twitter™, Instagram™, LinkedIn™, or Pinterest™.

The computing system 100 can process information for the user 202 based on a target goal 224. The target goal 224 is a result, an objective, a purpose, or a combination thereof sought by the user 202. The target goal 224 can be based on limited time, context, relevance, or a combination thereof. For example, the target goal 224 can include a good or a service sought or desired by the user 202. Also for example, the target goal 224 can include a destination for the user 202.

The target goal 224 can be associated with a target source 226. The target source 226 is a location, a structure, a person, an entity, an organization, or a combination thereof availing, providing, or facilitating the target goal 224. The user 202 can obtain or achieve the target goal 224 through or at the target source 226. For example, the target source 226 can include a business, a supplier, a service provider, a building, or a combination thereof for the target goal 224.

The computing system 100 can process additional information relative to the target goal 224 or the target source 226. For example, the computing system 100 can identify a parking lot 228, a surrounding area 230, a surrounding segment 232, or a combination thereof associated with the target goal 224 or the target source 226. Also for example, the computing system 100 can identify a relevant area 234 associated with the user 202, the target goal 224, the target source 226, the members 216, or a combination thereof.

The computing system 100 can identify the parking lot 228 accessible to the user 202 or the members 216 in accessing the target goal 224 or the target source 226. The computing system 100 can further identify geographical locations or areas associated with the target source 226 as the surrounding area 230. For example, the surrounding area 230 can include a structure, an entity, an organization, a physical location, or a combination thereof adjacent to the target source 226, within a threshold distance from the target source 226, sharing a trait or a characteristic common with the target source 226, or a combination thereof.

The computing system 100 can further identify access ways associated with the target source 226 as the surrounding segment 232. For example, the surrounding segment 232 can include a road, a path, a river, a portion of a route, an entrance or an exit, or a combination thereof adjacent to the target source 226, within a threshold distance from the target source 226, sharing a trait or a characteristic common with the target source 226, or a combination thereof.

The relevant area 234 is a geographical zone set for processing with the computing system 100. The relevant area 234 can be based on the target goal 224 or the target source 226. The relevant area 234 can include the target source 226, the surrounding area 230, the surrounding segment 232, or a combination thereof. The relevant area 234 can further include a geographic area associated with the target source 226 but not physically or geographically including the target source 226.

For example, the relevant area 234 can include an establishment or a structure, such as a business or a building, an area surrounding the business or the building, a city block, a town or a neighborhood, a city, a state, or a combination thereof.

Also for example, the relevant area 234 can include a zone associated with a commonality, such as based on a theme, a purpose, inhabitants, or an occurrence. As a more specific example, the relevant area 234 can include a shopping district, an ethnic town, a financial district, or a combination thereof. Also as a more specific example, the relevant area 234 can include downtown areas, entertainment areas, or a combination thereof. Also as a more specific example, the relevant area 234 can include an area associated with a landmark, a direction, or a combination thereof, such as South Bay, Stadium area, or "South of Market" (SOMA).

The computing system 100 can determine the relevant area 234 including an area boundary 236, an area size 238, an area category 240, or a combination thereof. The area boundary 236 can include an abstract line marking or distinguishing the relevant area 234. The area boundary 236 can identify the relevant area 234 by marking the edges or the ends encircling or surrounding the relevant area 234. The computing system 100 can determine the area boundary 236.

The area size 238 can include dimensions, magnitude, extent, or a combination thereof for the relevant area 234. The area size 238 can include square units, such as square meters or square miles, number of blocks, a radius, dimensions and shape of the area boundary 236, number or size of establishment or structure, or a combination thereof.

The area category 240 can include an abstract categorization or description for the relevant area 234. The area category 240 can be based on a set of different categorizations or labels predetermined by the computing system 100.

For example, the area category 240 can be based on goal provided or sought within the area, such as entertainment or dining, relative size or pricing associated therewith, popularity level thereof, or a combination thereof. As a more specific example, the area category 240 can include restaurant, comedy club, large or small, indoor or outdoor, price range, user-rating, maximum occupancy, private or public, commercial or residential, or a combination thereof.

The computing system 100 can calculate a current-occupancy 242, a current-parking occupancy 244, an occupant density 246, or a combination thereof. The computing system 100 can calculate the current-occupancy 242, the current-parking occupancy 244, the occupant density 246, or a combination thereof corresponding to the relevant area 234.

The current-occupancy 242 is a number or a quantity representing an amount of people or entities within the relevant area 234. For example, the current-occupancy 242 can include a number of patrons, vehicles, families, groups, occupied tables or stations, or a combination thereof for the relevant area 234. Also for example, the current-occupancy 242 can include a percentage representing the current number of occupancy relative to maximum occupancy for the relevant area 234.

The current-parking occupancy 244 is a number of vehicles or occupied resources for the vehicles within the relevant area 234. For example, the current current-parking occupancy 244 can represent a number of vehicles or occupied slots for parking lots associated with or included in the relevant area 234. Also for example, the current current-parking occupancy 244 can include a percentage representing the current number of vehicles or occupied slots relative to maximum availability thereof for the relevant area 234.

The occupant density 246 is a representation of a degree of use or crowded characteristic for the relevant area 234. The occupant density 246 can be based on the current-occupancy 242, the current-parking occupancy 244, the area size 238, the area category 240, the target source 226, the target source 226, the surrounding area 230, the surrounding segment 232, the current time 206, or a combination thereof.

It has been discovered that determining the relevant area 234 corresponding to the target goal 224 and calculating the occupant density 246 for the relevant area 234 for the current time 206 provides real-time information for crowdedness and associated impact on the user 202 for the target goal 224. The computing system 100 can determine the relevant area 234 based on the target goal 224 of the user 202. The computing system 100 can then calculate the occupant density 246 representing the real-time instance of the current-occupancy 242 for the relevant area 234.

The computing system 100 can calculate the occupant density 246 representing the crowdedness using the current-occupancy 242 and various other characteristics of the relevant area 234. The computing system 100 can use the occupant density 246 to estimate or determine impacts to the user, such as delays, change in quality, dangers, flow or movement, or a combination thereof caused by the occupant density 246.

Figure 3:
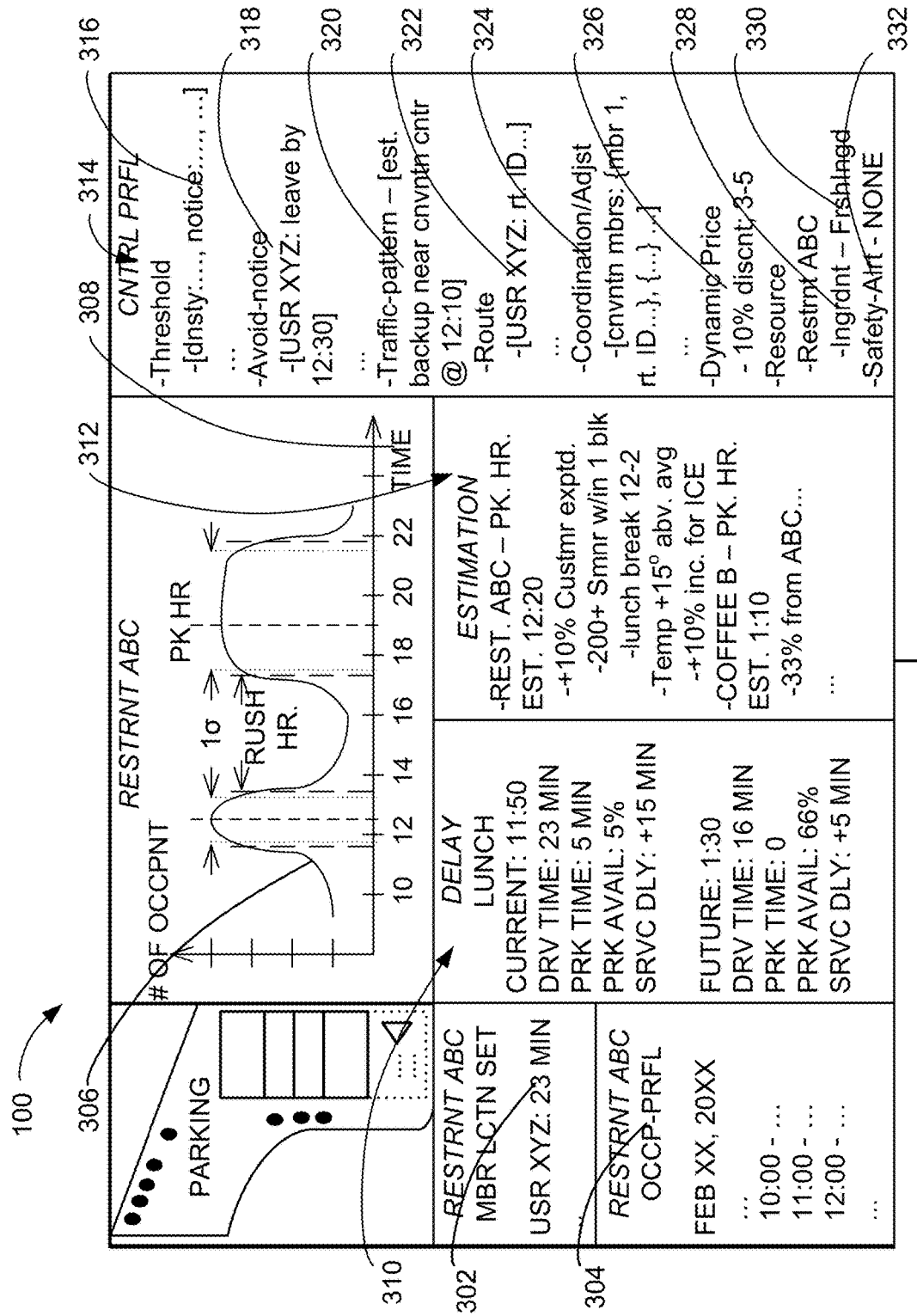
FIG. 3 is an example of a display interface of the second device of FIG. 1.

Referring now to FIG. 3, therein is shown example of a display interface of the second device 106 of FIG. 1. The computing system 100 can determine occupancy duration 302. The occupancy duration 302 is a length of time the user 202 of FIG. 2, the member 216 of FIG. 2, or a combination thereof have spent within an area. The occupancy duration 302 can be the duration the current location 204 of FIG. 2 corresponding to past times have been within the target source 226 of FIG. 2 or the relevant area 234 of FIG. 2 same as the current time 206 of FIG. 2.

The occupancy duration 302 can be used to distinguish an occupant, a patron, a consumer, or a combination thereof utilizing or engaging in the target goal 224 of FIG. 2 from a passer-by or a short-term visitor. The occupancy duration 302 can be relative to the area boundary 236 of FIG. 2 for the relevant area 234, the target source 226, or a combination thereof.

The occupancy duration 302 can be associated with "hovering" of GPS coordinates within an area in determining the user 202, the member 216, or a combination thereof occupying the relevant area 234 instead of passing through the relevant area 234. The computing system 100 can use the occupancy duration 302 to determine the member 216, the user 202, or a combination thereof as an occupant with or without the user 202, the member 216, or a combination thereof specifying or directly providing the location indicator 220 of FIG. 2, such as destination or check-in provided by the user 202, the member 216 or a combination thereof.

The computing system 100 can further determine an area occupancy-profile 304. The area occupancy-profile 304 is a historical record of the occupancy for an area or an establishment. The area occupancy-profile 304 can be for the relevant area 234, the target source 226, a region, an establishment or a business, a structure, or a combination thereof. The area occupancy-profile 304 of the relevant area 234 can be based on instances of the current-occupancy 242 of FIG. 2 for the relevant area 234 over time.

The computing system 100 can generate an area-density function 306. The area-density function 306 is a representation of relationship between an input parameter and the occupant density 246 of FIG. 2 resulting in response thereto. The area-density function 306 can be based on the area occupancy-profile 304. The area-density function 306 can based on a pattern, an average, or a combination thereof in the area occupancy-profile 304.

The area-density function 306 can correspond to input parameters including time parameter 308, such as an input variable for various times, the target goal 224, the target source 226, the area size 238 of FIG. 2, the area category 240 of FIG. 2, the occupant density 246 at the current time 206, the user 202, the member 216, or a combination thereof. The computing system 100 can use the area-density function 306 to predict or estimate at the future time 214 of FIG. 2.

The computing system 100 can further calculate various parameters that can affect the user 202 or the member 216 based on the occupant density 246 of FIG. 2. For example, the computing system 100 can calculate a density-correlated delay 310, a density-correlated estimation 312, or a combination thereof associated with the user 202 seeking the target goal 224 based on the relevant area 234 corresponding to the target goal 224 and the occupant density 246 of the relevant area 234.

The density-correlated delay 310 is a representation of time likely necessary in acquiring or achieving the target goal 224 for the user 202 as affected by the occupant density 246. For example, the density-correlated delay 310 can include amount of time necessary to arrive at or access the target source 226, number of parties or people preceding the user 202 upon arrival, speed or efficiency associated with the target goal 224 as affected by the occupant density 246, or a combination thereof. As a more specific example, the density-correlated delay 310 can include an estimate for travel time to a restaurant, a wait time to be seated, a delay in service from servers or kitchen due to overall demand or patrons, or a combination thereof.

The density-correlated estimation 312 is behavior or pattern associated with values of the occupant density 246 and context associated thereto. The density-correlated estimation 312 can represent a prediction or a likely behavior associated with the instances of the member 216 based on specific values or levels of the occupant density 246 and associated contexts, such as event, type, trait or characteristic of the members, location, reason, motivation, or a combination thereof.

For example, the density-correlated estimation 312 can include likely future movement or dispersion of the crowd, including time, direction, pattern, location, or a combination thereof for the crowd, such as for after an event or during a parade. As a more specific example, the density-correlated estimation 312 can include mob behavior relative to value of potential targets within a distance from the mob, such as in a riot or safety related situations.

Also as a more specific example, the density-correlated estimation 312 can include consumption behavior, such as timing, pattern, consumables, or a combination thereof of participants or spectators at an event, such as during a convention or a sporting event. Also as a more specific example, the density-correlated estimation 312 can include movement of spectators or participants after the event, such as toward parking areas or large walkways.

The computing system 100 can further generate and utilize a density-control profile 314. The density-control profile 314 is information for controlling one or more devices for the computing system 100. The density-control profile 314 can include a step, an instruction, a setting, a description, a configuration, a sequence thereof, or a combination thereof for controlling one or more devices for the computing system 100.

The density-control profile 314 can be for controlling the first device 102 of FIG. 1, the second device 106 of FIG. 1, or a combination thereof. For example, the density-control profile 314 can include a density threshold 316, a density-avoidance notice 318, a density-sensitive traffic-pattern 320, a density-sensitive price 326, a density-sensitive resource 328, a density-sensitive safety-alert 332, or a combination thereof.

The density threshold 316 is a limit or a range associated with the occupant density 246 for the density-control profile 314. The density threshold 316 can be used to control a device or a function thereof, initiate a process or a sequence, or a combination thereof for the computing system 100. The density threshold 316 can be a limit, a range, or a combination thereof associated with or specific to the target goal 224, the target source 226, the relevant area 234, other context, or a combination thereof associated with the occupant density 246.

For example, the density threshold 316 can be used to process the density-correlated delay 310 according to the target goal 224, the target source 226, the relevant area 234, other context, or a combination thereof. Also for example, the density threshold 316 can be used to trigger or initiate features for the first device 102, the second device 106, or a combination thereof.

The density threshold 316 can be predetermined by the computing system 100. The density threshold 316 can further be adjusted or determined dynamically based on a method or a process predetermined by the computing system 100. Details regarding the density threshold 316 are described below.

The density-avoidance notice 318 is a communication from the computing system 100 to the user 202 based on the occupant density 246 associated with the relevant area 234 for the target goal 224. The density-avoidance notice 318 can be for avoiding or optimizing the density-correlated delay 310 for the target goal 224.

For example, the density-avoidance notice 318 can include a warning regarding the density-correlated delay 310 relevant at the current time 206. Also for example, the density-avoidance notice 318 can include a notice regarding timing for leaving or initiating actions associated with the target goal 224 for optimizing the density-correlated delay 310, such as a "leave now", a "leave by . . . ", or a "leave later" type of notice. Also for example, the density-avoidance notice 318 can include rerouting feature or a presentation of an alternate route based on the occupant density 246.

The density-sensitive traffic-pattern 320 is a representation of density or flow associated with movements and travels associated with the occupant density 246. The density-sensitive traffic-pattern 320 can include prediction or estimation of movement of the mass represented by the occupant density 246, such as direction, location, timing, or a combination thereof for the movement of the mass.

For example, the density-sensitive traffic-pattern 320 can include an estimation for a direction or a movement of a crowd in comparison to high value or relevant targets or locations, such as for parades or demonstrations. Also for example, the density-sensitive traffic-pattern 320 can include movement of vehicles, such as for amount or average speed of vehicles, at the future time 214, such as when the spectators representing the occupant density 246 disperse. Also for example, the density-sensitive traffic-pattern 320 can be associated with movement of the members 216 in traversing to or within the relevant area 234 in establishing the occupant density 246.

As a more specific example, the density-sensitive traffic-pattern 320 can represent estimations regarding future locations or movements for a mob in a riot scenario, spectators at a parade, crowds associated with a march, or a combination thereof. Also as a more specific example, the density-sensitive traffic-pattern 320 can represent movement of people associated with events at a set time, such as before or after a game or a concert, relative to a flight schedule, or a combination thereof. Also as a more specific example, the density-sensitive traffic-pattern 320 can represent movement of people associated with contextual events, such as for meal times, cut-off time for alcohol sales, filing deadlines, discount offers, shopping seasons, weather, or a combination thereof.

The computing system 100 can generate a density-sensitive route 322, a density-sensitive traffic-adjustment 324, or a combination thereof based on the density-sensitive traffic-pattern 320. The density-sensitive route 322 is a set of connected paths for optimally traversing to a destination based on the density-sensitive traffic-pattern 320.

For example, the density-sensitive route 322 can include a route avoiding or seeking the relevant area 234 based on a dispersal pattern or movement of the crowd at the future time 214 according to the density-sensitive traffic-pattern 320. Also for example, the density-sensitive route 322 can include a parking lot, a public transportation mode, a public transportation station, or a combination thereof for optimizing the travel of the user 202 based on the density-sensitive traffic-pattern 320.

The density-sensitive traffic-adjustment 324 is a set of adjustments in guiding travels of people in optimizing traffic flow for a given area or a context. The density-sensitive traffic-adjustment 324 can include coordination amongst the members 216, the user 202, or a combination thereof in optimizing traffic flow for a given area.

The density-sensitive traffic-adjustment 324 can be based on a routine or a set of instructions predetermined by the computing system 100. The density-sensitive traffic-adjustment 324 can coordinate using the density-avoidance notice 318, the density-sensitive route 322, or a combination thereof for the user 202, the members 216, or a combination thereof. The density-sensitive traffic-adjustment 324 can be for traveling to, out of, within, or a combination thereof for the relevant area 234.

The density-sensitive price 326 is a rate or an expense calculated by the computing system 100 according to the occupant density 246. The density-sensitive price 326 can include a price dynamically set or adjusted for the target goal 224, other service, other good, or a combination thereof based on the occupant density 246.

The density-sensitive price 326 can include a promotional price for attracting clients or customers. For example, the density-sensitive price 326 can include a price based on the occupant density 246 for the target source 226 at the current time 206, the occupant density 246 projected or estimated for the future time 214, or a combination thereof. As a more specific example, the density-sensitive price 326 can be lowered when the occupant density 246 at the current time 206 or estimated for the future time 214 is below a threshold predetermined by the computing system 100, such as the density threshold 316.

The density-sensitive resource 328 is a good or a service affected by the occupant density 246. The density-sensitive resource 328 can include the good or the service needed or sought according to the occupant density 246. For example, the density-sensitive resource 328 can include transportation service, such as a taxi or ride-sharing service, public safety service, or a combination thereof.

The density-sensitive resource 328 can be provided by a resource provider 330. The computing system 100 can communicate with the resource provider 330. The computing system 100 can coordinate with the resource provider 330 for the density-sensitive resource 328. The computing system 100 can communicate the occupant density 246 to the resource provider 330.

The computing system 100 can further generate a density-sensitive safety-alert 332. The computing system 100 can generate a note communicating safety issues related to the occupant density 246. The computing system 100 can generate or communicate the density-sensitive safety-alert 332 to notify the user 202, the members 216, the density-sensitive resource 328, such as a public safety entity or an enforcement agency, or a combination thereof. The density-sensitive safety-alert 332 can include the density-avoidance notice 318, communications to the resource provider 330 of the density-sensitive resource 328, or a combination thereof associated with safety.

For example, the computing system 100 can notify the user 202, the members 216, or a combination thereof regarding potentially dangerous crowds, such as protestors. Also for example, the computing system 100 can notify police department or fire department of dangerous crowds or over-crowding situations.

Figure 4:
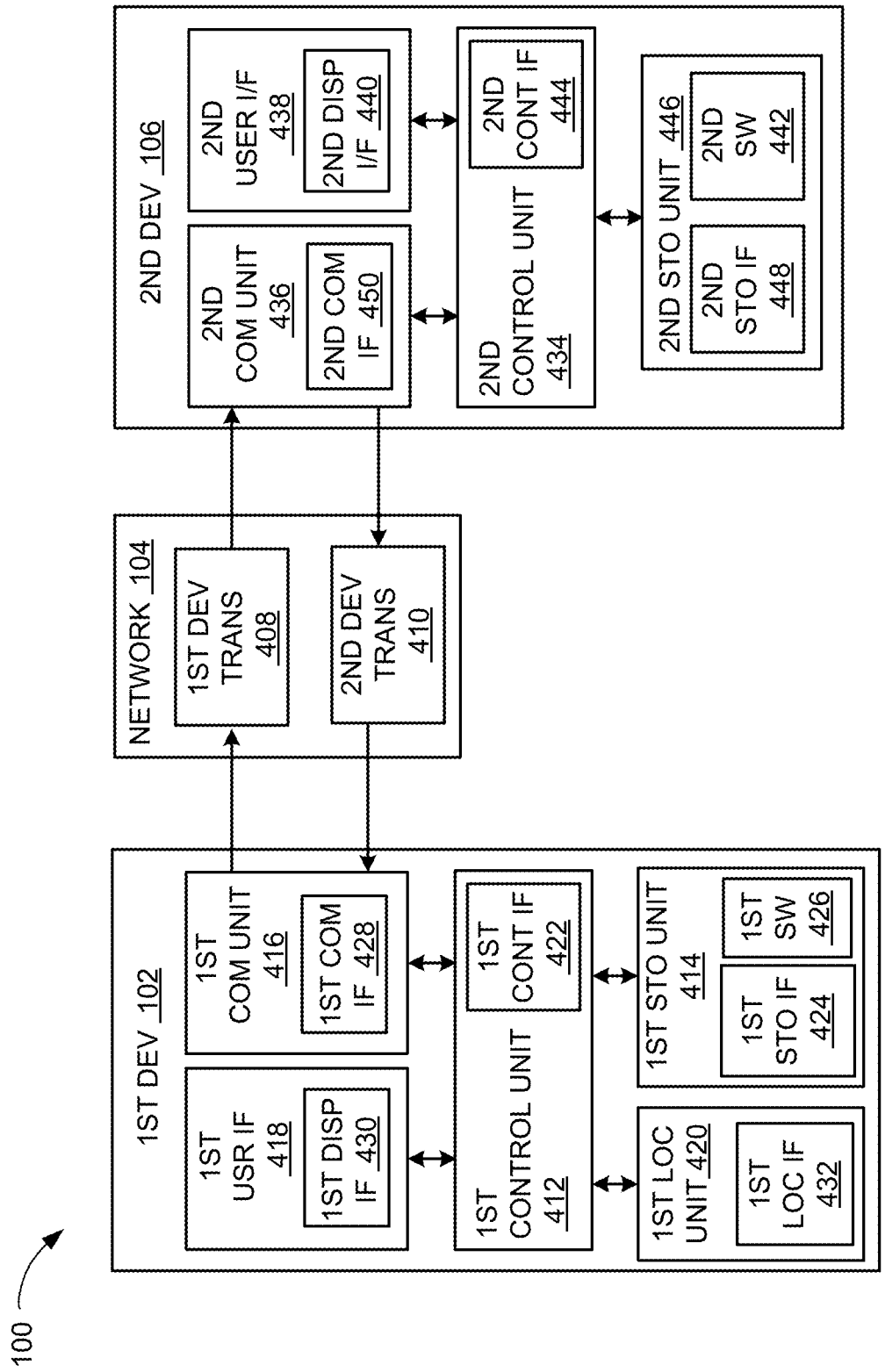
FIG. 4 is an exemplary block diagram of the computing system.

Referring now to FIG. 4, therein is shown an exemplary block diagram of the computing system 100. The computing system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418, and a first location unit 420. The first control unit 412 can include a first control interface 422. The first control unit 412 can execute a first software 426 to provide the intelligence of the computing system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a desktop computer, and the network 104.

The first communication unit 416 can also function as a communication hub allowing the first device 102 to function as part of the network 104 and not limited to be an end point or terminal unit to the network 104. The first communication unit 416 can include active and passive components, such as microelectronics or an antenna, for interaction with the network 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control unit 412 can operate the first user interface 418 to display information generated by the computing system 100. The first control unit 412 can also execute the first software 426 for the other functions of the computing system 100, including receiving location information from the first location unit 420. The first control unit 412 can further execute the first software 426 for interaction with the network 104 via the first communication unit 416.

The first location unit 420 can generate location information, current heading, current acceleration, and current speed of the first device 102, as examples. The first location unit 420 can be implemented in many ways. For example, the first location unit 420 can function as at least a part of the global positioning system, an inertial navigation system, a cellular-tower location system, a pressure location system, or any combination thereof. Also, for example, the first location unit 420 can utilize components such as an accelerometer or GPS receiver.

The first location unit 420 can include a first location interface 432. The first location interface 432 can be used for communication between the first location unit 420 and other functional units in the first device 102. The first location interface 432 can also be used for communication external to the first device 102.

The first location interface 432 can receive information from the other functional units or from external sources, or can transmit information to the other functional units or to external destinations. The external sources and the external destinations refer to sources and destinations external to the first device 102.

The first location interface 432 can include different implementations depending on which functional units or external units are being interfaced with the first location unit 420. The first location interface 432 can be implemented with technologies and techniques similar to the implementation of the first control unit 412.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, a second user interface 438, and a second storage unit 446.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the computing system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computing system 100, including operating the second communication unit 436 to communicate with the first device 102 over the network 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations external to the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the computing system 100 is shown with the second storage unit 446 as a single hierarchy storage system, although it is understood that the computing system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the network 104.

The second communication unit 436 can also function as a communication hub allowing the second device 106 to function as part of the network 104 and not limited to be an end point or terminal unit to the network 104. The second communication unit 436 can include active and passive components, such as microelectronics or an antenna, for interaction with the network 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the network 104 to send information to the second device 106 in the first device transmission 408. The second device 106 can receive information in the second communication unit 436 from the first device transmission 408 of the network 104.

The second communication unit 436 can couple with the network 104 to send information to the first device 102 in the second device transmission 410. The first device 102 can receive information in the first communication unit 416 from the second device transmission 410 of the network 104. The computing system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 5:
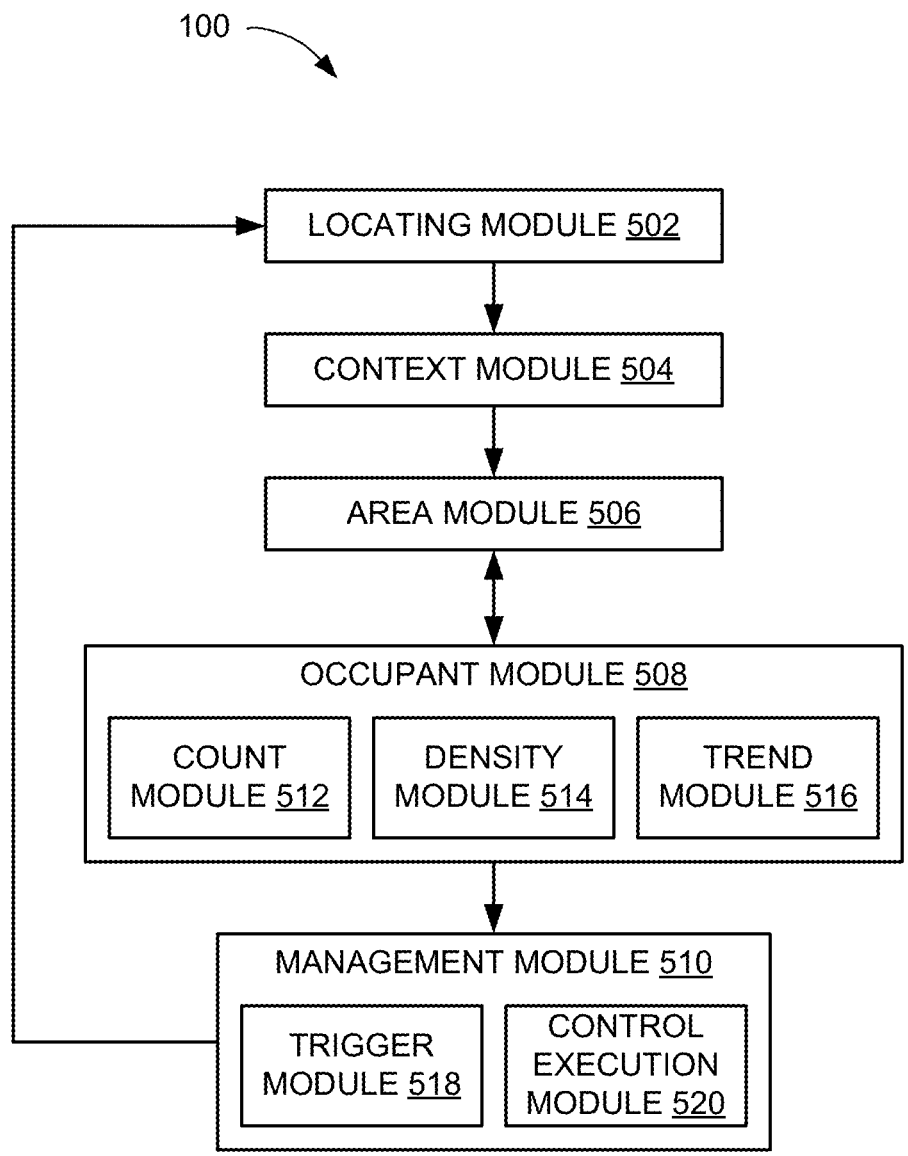
FIG. 5 is a control flow of the computing system.

Referring now to FIG. 5, therein is shown a control flow of the computing system 100. The computing system 100 can include a locating module 502, a context module 504, an area module 506, an occupant module 508, a management module 510, or a combination thereof.

The locating module 502 can be coupled to the context module 504. The context module 504 can be further coupled to the area module 506. The area module 506 can be further coupled to the occupant module 508, the occupant module 508 can be further coupled to the management module 510. The management module 510 can be further coupled to the locating module 502.

The modules can be coupled using wired or wireless connections, by having an output of one module as an input of the other module, by having operations of one module influence operation of the other module, or a combination thereof. The modules can be directly coupled with no intervening structures or objects other than the connector there-between, or indirectly coupled.

The locating module 502 is configured to locate people or devices associated with people associated with the computing system 100. For example, the locating module 502 can locate the user 202 of FIG. 2, the members 216 of FIG. 2, or a combination thereof. Also for example, the locating module 502 can locate the second device 106 of FIG. 1, the first device 102 of FIG. 1 associated with the user 202, the members 216, or a combination thereof.

The locating module 502 can locate by determining the current location 204 of FIG. 2 of the user 202, the members 216, the first device 102, the second device 106, or a combination thereof for the computing system 100. The locating module 502 can locate using a variety of methods.

For example, the locating module 502 can determine the current location 204 based on directly interacting with the user 202, the members 216, or a combination thereof. The locating module can determine the current location 204 based on the navigation information, the location information, the location indicator 220 of FIG. 2 from the first location unit 420 of FIG. 4. The locating module 502 can use the location unit 420 to determine the coordinate of the first device 102 corresponding to the user 202, the members 216, or a combination thereof.

Continuing with the example, the locating module 502 can further use the first communication unit 416 of FIG. 4, the second communication unit 436 of FIG. 4, or a combination thereof to determine the current location 204 by communicating the current location 204 between devices. The locating module 502 can determine the current location 204 using locating information direct from devices owned or used by each instance of the user 202, the members 216, or a combination thereof instead of dedicated devices, such as entrance counters or public cameras.

Also for example, the locating module 502 can determine the current location 204 using the location indicator 220 directly generated by or directly originating from the user 202, the members 216, or a combination thereof. The locating module 502 can use the first communication unit 416, the second communication unit 436, or a combination thereof to communicate information provided by the user 202, the members 216, or a combination thereof. The locating module 502 can use the first control unit 412 of FIG. 4, the second control unit 434 of FIG. 4, or a combination thereof to identify the location indicator 220 from the user-provided information.

As a more specific example, the locating module 502 can identify the location indicator 220 based on the transaction record 208 of FIG. 2. The locating module 502 can interact with financial institutions or applications on the first device 102 associated with the user 202 or the members 216 to access the transaction record 208.

Continuing with the example, the locating module 502 can use the first control unit 412, the second control unit 434, or a combination thereof to distinguish between different types of transactions, such as online transactions, financial records inputted by the user 202 or the members 216, including pictures of receipts or entries from the user 202 or the members 216, on-site or in-person transactions, or a combination thereof. The locating module 502 can identify the category of transactions indicating physical location or presence of the user 202 or the members 216, such as for the on-site or in-person transactions, sourcing address for online transactions, user provided transactional information, or a combination thereof.

Continuing with the example, the locating module 502 can determine the location, address, names of transactional parties, or a combination thereof as the location indicator 220 for the user 202 or the members 216 associated with the transaction record 208. The locating module 502 can further use the time of the transaction changes from last-recorded location, error rate, delay or refresh-rate associated with the record, or a combination thereof to determine the location indicator 220 from the transaction record 208.

Also as a more specific example, the locating module 502 can determine the location indicator 220 from the schedule calendar 210 of FIG. 2 associated with the user 202, the members 216, or a combination thereof. The locating module 502 can determine the location indicator 220 as the geographic location of the calendar event 212 of FIG. 2 associated with attendance or physical presence of the user 202, the members 216, or a combination thereof. The locating module 502 can further determine the location indicator 220 based on the scheduled time of the calendar event 212.

Also as a more specific example, the locating module 502 can determine the location indicator 220 from user-provided information through the social media 222 of FIG. 2. The locating module 502 can determine the location indicator 220 based on keywords or pictures within user-provided content, such as checking-in, rating, blog entries, or a combination thereof. The locating module 502 can further determine the location indicator 220 based on location information of other users or members identified as being physically present near the user 202 or the members 216.

Also as a more specific example, the locating module 502 can determine the location indicator 220 based on a connection information, such as for WiFi or mobile phone connections. The locating module 502 can communicate the number of connections facilitated by one or more devices owned, used, controlled, or operated by the user 202, the members 216, the computing system 100, or a combination thereof.

Continuing with the example, the locating module 502 can communicate number of connections for exchanging data as facilitated by the first device 102, the second device 106, or a combination thereof, such as access points, hotspots, routers, modems, portals, stations, or a combination thereof. The locating module 502 can communicate the number of connections, information regarding addresses or identifications regarding individual connections, or a combination thereof between the first device 102, the second device 106, or a combination thereof.

As further examples, the location module 502 can utilize cell-tower triangulation, requested routing destinations, iBeacon™ information, traffic flow, online reservations, direct feedback from establishments, or a combination thereof for determining the location indicator 220. The location module 502 can use real-time information directly originated by the user 202, the members 216, or a combination thereof instead of dedicated devices, such as a public or security camera or a check-in counter, to determine the location indicator 220 and the current location 204.

The locating module 502 can store the current location 204 corresponding to the user 202, each of the members 216, or a combination thereof. The locating module 502 can store the location information in the first storage unit 414 of FIG. 4, the second storage unit 446 of FIG. 4, or a combination thereof. The locating module 502 can store the current location 204 according to the current time 206 of FIG. 2 associated thereto. The locating module 502 can track the locations or movement of the user 202, each of the members 216, or a combination thereof based on the location information corresponding to time for the locating process.

The locating module 502 can use the first control unit 412, the second control unit 434, or a combination thereof to determine the member location set 218 of FIG. 2 for representing the user 202, one or more of the members 216, or a combination thereof. The locating module 502 can determine the member location set 218 based on the current location 204 corresponding to the user 202, each of the members 216, or a combination thereof. The locating module 502 can determine the member location set 218 based on grouping the user 202, the members 216, or a combination thereof according to a category, a status, the current location 204, or a combination thereof.

For example, the locating module 502 can group the user 202, the members 216, or a combination thereof according to their physical presence within an area or a region. The locating module 502 can determine the member location set 218 as one or more grouping of the user 202, the members 216, or a combination thereof physically present in the same structure, establishment or a provider, city block, a road or a portion thereof, a town or a city, or a combination thereof. The locating module 502 can compare the current location 204 for the user 202, the members 216, or a combination thereof to map information for determining the groupings thereof.

Also for example, the locating module 502 can group the user 202, the members 216, or a combination thereof according to their status or category associated with their movement. The locating module 502 can determine that the user 202, the members 216, or a combination thereof are travelling or in transition in comparison to stationary or occupying a location.

The locating module 502 can determine the mobility or the mobile status of the user 202, the members 216, or a combination thereof in a variety of ways. For example, the locating module 502 can determine the mobility or status thereof based on the current location 204, guidance status, user-provided information, duration associated with the current location 204, or a combination thereof.

As a more specific example, the locating module 502 can determine the mobility or the status of the user 202, the members 216, or a combination thereof based on category of the current location 204 associated thereto. The locating module 502 can determine the mobility or the status as traveling or mobile when the current location 204 is a road or a path associated with vehicles, route for public transportation, public access ways, or a combination thereof. The locating module 502 can further determine the mobility or the status as stationary or occupying when the current location 204 is within an entity, a structure, an enclosure, or a combination thereof.

Also as a more specific example, the locating module 502 can determine the mobility or the status based on a guidance status or a routing request associated with the user 202, the members 216, or a combination thereof. The locating module 502 can determine the mobility or the status as traveling or mobile when the guidance status or routing request is ongoing or active. The locating module 502 can further determine the mobility or the status as stationary or occupying when the guidance status or routing request finishes, is not active, is stopped, indicates arrival at a destination, or a combination thereof.

Also as a more specific example, the locating module 502 can determine the mobility or the status based on user-provided information. The locating module 502 can determine the mobility or the status according to the calendar event 212 relative to the current time 206, according to check-in or rating provided by the user, or a combination thereof.

Also as a more specific example, the locating module 502 can determine the mobility or the status based on a GPS-hover calculation. The locating module 502 can calculate the occupancy duration 302 of FIG. 3 associated with the location of the user 202, the members 216, or a combination thereof. The locating module 502 can calculate the occupancy duration 302 based on the record of the current location 204 within a same area or structure leading up to the current time 206. The locating module 502 can further calculate the occupancy duration 302 based on the duration of grouping or membership within same instance of the member location set 218.

Continuing with the example, the locating module 502 can compare the occupancy duration 302 with a threshold for the corresponding area. The threshold for a location, an area or a region, a structure, an establishment, an event, or a combination thereof can be predetermined by the computing system 100. The locating module 502 can determine the mobility or the status as stationary or occupying when the occupancy duration 302 is greater than the predetermined threshold.

The locating module 502 can store the mobility status, occupancy, duration, groupings, locations, or a combination thereof. The locating module 502 can store the information in association with the user 202, the members 216, the corresponding location, or a combination thereof. The locating module 502 can store the information in the first storage unit 414, the second storage unit 446, or a combination thereof.

The locating module 502 can further communicate such as query, receive, send, or a combination thereof for occupancy information with an area, a region, a structure, an establishment, a group, a service, an event, an administrator or an organizer thereof, or a combination thereof. The locating module 502 can store the occupancy information according to associated relevant time thereof as described above.

After processing the location information, the control flow can pass from the locating module 502 to the context module 504. For example, the control flow can pass by having a processing result, such as the current location 204, the member location set 218, occupancy status or information, or a combination thereof as an output from the locating module 502 to an input of the context module 504.

Also for example, the control flow can further pass by storing the processing result at a location known and accessible to the context module 504. Also for example, the control flow can further pass by notifying the context module 504, such as by using a flag, an interrupt, a status signal, or a combination thereof. Also for example, the control flow can further pass using a combination of the processes described above.

The context module 504 is configured to determine a context associated with one or more parties associated with the computing system 100. The context module 504 can determine the context associated with the user 202, one or more of the members 216, an entity, a location, an event, or a combination thereof.

For example, the context module 504 can determine the context based on a goal, a purpose, a reason, an importance or a value, an urgency, or a combination thereof associated with the one or more parties. The context module 504 can determine a pattern or a connection between various available information to determine the context.

Continuing with the example, the context module 504 can use current information, previous historical information, information associated with other similar parties, or a combination thereof. The context module 504 can use a pattern recognition mechanism, machine-learning mechanism, predetermined patterns or models, or a combination thereof to determine the context for one or more of the parties.

As a more specific example, the context module 504 can determine the context including the target goal 224 of FIG. 2 for the user 202. The context module 504 can determine the target goal 224 based on interacting with the user using the first user interface 418 of FIG. 4, the second user interface 438 of FIG. 4, the first communication unit 416 of FIG. 4, the second communication unit 436 of FIG. 4, or a combination thereof. The context module 504 can receive the target goal 224 from or identified by the user 202.

The context module 504 can further determine the target goal 224 based on the schedule calendar 210, communicated material, user provided content on the social media 222, or a combination thereof. For example, the context module 504 can determine the target goal 224 based on an objective stated in or derived for the calendar event 212. Also for example, the context module 504 can determine the target goal 224 based on a reminder, a shopping list, or a combination thereof previously provided or stored by the user 202.

Also for example, the context module 504 can determine the target goal 224 based on a text message or an email from the user 202 or one of the members 216 identifying the target goal 224 for the user 202. Also for example, the context module 504 can determine the target goal 224 based on similar material shared by the user 202 on the social media 222. Also for example, the context module 504 can determine the target goal 224 based on a categorization or a type of the destination for a route requested or used by the user 202 or the location of the calendar event 212.

The context module 504 can use the first control unit 412, the second control unit 434, the first communication unit 416, the second communication unit 436, or a combination thereof to determine the target goal 224. The context module 504 can store the target goal 224 in the first storage unit 414, the second storage unit 446, or a combination thereof.

After determining context, such as including the target goal 224, the control flow can pass from the context module 504 to the area module 506. The control flow can pass similarly as described above between the locating module 502 and the context module 504, but using processing results of the context module 504, such as the target goal 224.

The area module 506 is configured to analyze geographic areas associated with the target goal 224. The area module 506 can determine the parking lot 228 of FIG. 2, the surrounding area 230 of FIG. 2, the surrounding segment 232 of FIG. 2, the target source 226 of FIG. 2, or a combination thereof associated with the target goal 224.

The area module 506 can determine the target source 226 associated with the target goal 224. The area module 506 can determine a location associated with a group, a person, an entity, a structure, a business, a provider, or a combination thereof associated with the target goal 224 as the target source 226. The area module 506 can similarly determine a destination, a location for the calendar event 212, or a combination thereof associated with determining the target goal 224 as the target source 226.

The area module 506 can determine geographic areas associated with or surrounding the target source 226. The area module 506 can determine the parking lot 228 as the geographic area classified for storing vehicles for the target source 226. The area module 506 can determine parking locations within property boundary of the target source 226, nearest to the target source 226, directly associated or linked to the target source 226 for map information, or a combination thereof as the parking lot 228.

The area module 506 can further determine the surrounding area 230, the surrounding segment 232, or a combination thereof for the target source 226. The area module 506 can determine roads or pathways within geographic proximity or in relations to the target source 226 as the surrounding segment 232. The area module 506 can determine the roads within a distance or having geographic relationship to the target source 226 predetermined by the computing system 100 as the surrounding segment 232.

The area module 506 can further determine geographic areas, entities, structures, or a combination thereof as within a distance or having geographic or logical relationship to the target source 226 predetermined by the computing system 100 as the surrounding area 230. For example, the area module 506 can determine city blocks surrounding the target source 226, between the user 202 and the target source 226, or a combination thereof as the surrounding area 230.

Also for example, the area module 506 can determine the surrounding area 230 to include area corresponding to the property boundary surrounding the target source 226 as the surrounding area 230. Also for example, the area module 506 can determine the surrounding area 230 as geographic region or structure associated with or including a trait or a characteristic, such as categorization, zip code, price range, or a combination thereof, in common with the target source 226.

The area module 506 can further determine the relevant area 234 of FIG. 2 corresponding to the target goal 224. The area module 506 can determine the relevant area 234 based on the surrounding area 230, the parking lot 228, the surrounding segment 232, or a combination thereof. The area module 506 can determine the relevant area 234 as the target source 226, the surrounding area 230, the parking lot 228, the surrounding segment 232, a portion therein, or a combination thereof.

The area module 506 can determine the relevant area 234 based on a variety of factors. For example, the area module 506 can determine the relevant area 234 based on the context, such as the current time 206 or a significance thereof, such as for holidays or in relation to events, the target goal 224 of the user 202 or the members 216, the target source 226 or a categorization thereof, the purpose or reasons for the target goal 224, event time or duration, season, weather, or a combination thereof.

As a more specific example, the area module 506 can use a method or a process predetermined by the computing system 100 to designate the relevant area 234 for the target goal 224 of lunch as a particular restaurant or a region around a target restaurant for the target source 226, based on the current time 206 in relation to common lunch hours for the area. Also as a more specific example, the area module 506 can adjust the relevant area 234 based on current-occupancy, estimated or predicted occupancy, historical data, or a combination thereof from the occupant module 508.

The area module 506 can determine the area boundary 236 of FIG. 2 for determining the relevant area 234. The area module 506 can determine the area boundary 236 based on divisions, demarcations, boundaries, or a combination thereof included in map information. The area module 506 can identify the entity, the structure, the group, or a combination thereof according to the map information relative to the target source 226 for determining the relevant area 234. The area module 506 can determine one or more continuous boundary surrounding the identified map information as the area boundary 236.

The area module 506 can calculate a set of multiple boundaries as the area boundary 236 for the target goal 224. For example, the area module 506 can calculate the area boundary 236 as the structure boundary or shape of the target source 226, property boundary for the geographic area including the target source 226 and the parking lot 228, one or more city blocks including the target source 226, or a combination thereof as the area boundary 236. Also for example, the area module 506 can determine the area boundary 236 for representing other additional areas separate or disconnected from a boundary including the target source 226, such as for including a significant location or establishment in geographic proximity or with logical connection to the target source 226.

The area module 506 can calculate the area size 238 of FIG. 2 for the relevant area 234. The area module 506 can calculate the area size 238 based on the area boundary 236. The area module 506 can calculate the area size 238 corresponding to each enclosed boundary of or included in the relevant area 234.

The area module 506 can further determined the area category 240 of FIG. 2 for describing the relevant area 234 or portions therein. The area module 506 can determine the area category 240 based on database information, websites, user-provided content, or a combination thereof. The area module 506 can determine the area category 240 as a label, a description, a categorization or a type, or a combination thereof.

The area module 506 can determine the area category 240 based on information regarding the entity, the structure, the business, the group, or a combination thereof located within the area boundary 236. The area module 506 can determine the area category 240 based on a commonality, a majority, a concentration or a commonality above a threshold predetermined by the computing system 100, or a combination thereof for one or across multiple entities, structures, businesses, groups, or a combination thereof within the area boundary 236.

The area module 506 can use the first communication unit 416, the second communication unit 436, the first storage interface 424 of FIG. 4, the second storage interface 448 of FIG. 4, or a combination thereof to access various information regarding map information, entities or structures within a given area, or a combination thereof. The area module 506 can use the first control unit 412, the second control unit 434, or a combination thereof to determine the relevant area 234, the target source 226, the surrounding area 230, boundaries or size or categories associated thereto, or a combination thereof. The area module 506 can store the processed information in the first storage unit 414, the second storage unit 446, or a combination thereof.

After processing geographic area information or map information, the control flow can pass from the area module 506 to the occupant module 508. The control flow can pass similarly as described above between the locating module 502 and the context module 504, but using processing results of the area module 506, such as the target source 226, the relevant area 234, traits or characteristics thereof, or a combination thereof.

The occupant module 508 is configured to process information regarding people with respect to their locations. The occupant module 508 can identify the user 202, one or more of the members 216, or a combination thereof with respect to the occupied area, entity, structure, location, or a combination thereof. The occupant module 508 can include a count module 512, a density module 514, a trend module 516, or a combination thereof for processing occupancy information.

The count module 512 is configured to calculate the current-occupancy 242 of FIG. 2 for the relevant area 234. The count module 512 can calculate the current-occupancy 242 for representing the user 202, one or more of the members 216, or a combination thereof located at or within the relevant area 234.

The count module 512 can calculate the current-occupancy 242 based on the member location set 218 corresponding to one or more of the establishment, entity, structure, or a combination thereof within the relevant area 234. For example, the count module 512 can calculate the current-occupancy 242 based on counting the number of users or members within the target source 226, within a business or a property within a boundary surrounding the target source 226, within a business or a property within a different boundary apart from and related to the target source 226, or a combination thereof.

The count module 512 can further calculate the current-occupancy 242 based on an occupancy or transient mode or status corresponding to each of the user 202, the members 216, or a combination thereof. The count module 512 can determine the occupancy status for representing intention of the user 202, one or more of the members 216, or a combination thereof to stay for a duration or intention to occupy the area or the structure encompassing the current location 204. The count module 512 can further determine the occupancy status for representing intention of the user 202, one or more of the members 216, or a combination thereof to arrive, stay, or occupy a different location or area in traversing through the current location 204.

The count module 512 can determine the occupancy status in a variety of ways as described for the locating module 502. For example, the count module 512 can determine the occupancy status using destination, location of the calendar event 212, GPS hover mechanism and the occupancy duration 302 of FIG. 3, or a combination thereof.

As a more specific example, the count module 512 can determine the occupancy status based on the occupancy duration 302 exceeding a time threshold predetermined by the computing system 100. The time threshold can be specific to or adjusted based on categorization or a description for the corresponding area or structure, such as for distinguishing a person in transit, a person attempting to determine a wait time at a restaurant and a patron, a person attempting to get through a crowd and a spectator, or a combination thereof.

The count module 512 can further calculate or adjust the current-occupancy 242 based on feedback information from the business or the property within the relevant area 234. The count module 512 can use the first communication unit 416, the second communication unit 436, or a combination thereof to communicate, such as sending or receiving, occupancy information, usage information, backlog or queue, or a combination thereof for one or more business, entity, structure, service, group, area, or a combination thereof.

The count module 512 can calculate the current-occupancy 242 based on adding or combining the number of people within the relevant area 234 according to the member location set 218 or the feedback information corresponding to the entities or areas within the relevant area 234. The count module 512 can further calculate the current-occupancy 242 based on the number of the user 202, the members 216, or a combination thereof occupying their given location with the relevant area 234 with or without using the member location set 218.

The count module 512 can further calculate the current-occupancy 242 based on calculating a percentage of occupancy for map units, such as buildings, entities, structures, region, or a combination thereof within the relevant area 234. The count module 512 can calculate the current-occupancy 242 based on comparing the current number of people to a maximum occupancy or an average occupancy for the map units.

It has been discovered that the current-occupancy 242 for the current time 206 calculated in real-time based on the location indicator 220 directly from users or devices of the computing system 100 provides improved accuracy in number of occupants for wider set of geographical area. The computing system 100 can use the real-time information generated by the user 202, the members 216, or a combination thereof to locate the user 202, the members 216, or a combination thereof as described above. Mapping of such information to map information for the current-occupancy 242 for specific regions, establishments, entities, structures, or a combination thereof can provide accurate occupancy information for the corresponding areas.

The density module 514 is configured to calculate the occupant density 246 of FIG. 2 corresponding to the relevant area 234. The density module 514 can calculate the occupant density 246 based on the current-occupancy 242, the area boundary 236, the area size 238, the area category 240, or a combination thereof.

For example, the density module 514 can calculate the occupant density 246 based on combining the current-occupancy 242 and the area size 238 within the area boundary 236. As a more specific example, the density module 514 can calculate the occupant density 246 as number of people per a unit of area, such as square foot or per building, based on dividing the current-occupancy 242 by the area size 238 for corresponding boundary in the area boundary 236.

Also as a more specific example, the density module 514 can calculate an average number of occupants or percentage occupancy for the units of area within the corresponding boundary in the area boundary 236. The density module 514 can average the comparison percentages for each of the map units, for certain instances of the map units meeting a condition or a requirement, or a combination thereof for the current-occupancy 242.

It has been discovered that the occupant density 246 calculated in real-time based on the location indicator 220 directly from users or devices of the computing system 100 provides improved measure of load or demand in relation to capacity for wider set of geographical area. The computing system 100 can use real-time information generated by the user 202, the members 216, or a combination thereof to locate the user 202, the members 216, or a combination thereof as described above. Mapping of such information to map information for the current-occupancy 242 for specific regions, establishments, entities, structures, or a combination thereof and calculating density relative to capacity thereof can provide accurate information regarding the current load or demand for the corresponding area.

The trend module 516 is configured to process the occupant density 246 for further information. The trend module 516 can generate or update the area occupancy-profile 304 of FIG. 3.

The trend module 516 can generate or update the area occupancy-profile 304 by recording or storing the current-occupancy 242, the member location set 218, the occupant density 246, or a combination thereof for the relevant area 234, one or more of sub-area or establishment therein, or a combination thereof.

The trend module 516 can record or store the information with associated or corresponding time for the information. The trend module 516 can generate or update the area occupancy-profile 304 as a historical record of occupancy or density for given areas specific to segments of time. The trend module 516 can further generate or update the area occupancy-profile 304 for describing history for various boundaries, such as for each establishment or business, The trend module 516 can further generate the area-density function 306 of FIG. 3. The trend module 516 can generate the area-density function 306 based on the occupant density 246, the area occupancy-profile 304, the member location set 218, or a combination thereof for the relevant area 234, one or more establishment or sub-area therein, or a combination thereof.

For example, the trend module 516 can generate the area-density function 306 as a function of the time parameter 308 of FIG. 3 for each business, establishment, group, structure, service, region, or a combination thereof represented in the map. Also for example, the trend module 516 can generate the area-density function 306 dynamically based on determination of the relevant area 234.

The trend module 516 can generate the area-density function 306 based on a variety of methods. For example, the trend module 516 can average the occupant density 246 for a given area for a given value or instance of the time parameter 308 across the area occupancy-profile 304.

Also for example, the trend module 516 can analyze the area occupancy-profile 304 according to various contextual parameters, such as time of day, day of week, season, specific meaning or significance attributed to time or day, changes in supply or demand, events, significance of location, or a combination thereof. The trend module 516 can utilize pattern analysis mechanisms or machine-learning mechanisms to determine the area-density function 306 from the area occupancy-profile 304.

The trend module 516 can generate the area-density function 306 corresponding to each establishment, entity, business, structure, or a combination thereof. The trend module 516 can generate the area-density function 306 for candidates or instances of the target source 226. The trend module 516 can generate based on the area occupancy-profile 304 for corresponding to each establishment, entity, business, structure, or a combination thereof on the map.

The trend module 516 can further generate the area-density function 306 corresponding to a group of establishments, entities, businesses, structures, or a combination thereof for the relevant area 234. The trend module 516 can generate the area-density function 306 based on combining the area occupancy-profile 304 corresponding to each of the establishments, entities, businesses, structures, or a combination thereof within the group. The trend module 516 can then generate the area-density function 306 corresponding to the group based on the combined instance of the area occupancy-profile 304.

The trend module 516 can further average or combine individual instances of the area-density function 306 corresponding to each of the establishments, entities, businesses, structures, or a combination thereof within the group to generate the area-density function 306 for the group. The trend module 516 can use weighted average, overall combined maximum or minimum number of people with the combined area, aggregation according to the time parameter 308, or a combination thereof to combine the instances of the area-density function 306.

It has been discovered that the area-density function 306 based on the occupant density 246 provides increased accuracy regarding prediction or estimation of the load or demand in relation to capacity at a location for the future time 214 of FIG. 2. The real-time information can be used to identify the current-occupancy 242 as well as performance or capacity of the each location serving as the target source 226. The computing system 100 can use the occupancy information to generate the area-density function 306 for any region or location for representing patterns or behaviors of occupancy according to time. The computing system 100 can utilize the patterns or behaviors to predict or estimate the current-occupancy 242 for the future time 214.

The trend module 516 can further calculate a performance rate for obtaining the target goal 224 specific for entity, establishment, service, business, structure, sub-region, or a combination thereof in the map. The trend module 516 can calculate the performance rate including a delay time, capacity, performance, speed, or a combination thereof for the user 202 or the members 216 obtaining the target goal 224. The trend module 516 can calculate the performance rate for describing the entity, establishment, service, business, structure, sub-region, or a combination thereof.

The trend module 516 can calculate the performance rate based on the occupancy duration 302 of the user 202 or the members 216. The trend module 516 can calculate the performance rate based on comparing the occupancy duration 302 of the user 202 or the members 216 arriving at different times associated with different number of current-occupancy 242, the occupant density 246, or a combination thereof.

The trend module 516 can calculate the performance rate based on increase in the occupancy duration 302 when the current-occupancy 242, the occupant density 246, or a combination thereof is greater than a threshold predetermined by the computing system 100. The trend module 516 can include the performance rate as part of map data, the area occupancy-profile 304, the area-density function 306, or a combination thereof.

It has been discovered that the performance rate calculated based on real-time instances of the location indicator 220 and the occupancy duration 302 provides accurate representation of demand-based performance in providing the target goal 224. The trend module 516 can use the location indicator 220 directly from the user 202 or the members 216 for the current location 204 instead of representation or information from the providers themselves. The trend module 516 can use the occupancy duration 302 to calculate a representation of the performance as related to the total stay for the user 202 or the members 216 at the corresponding target source 226.

The occupant module 508 can use the first communication unit 416, the second communication unit 436, the first storage interface 424 of FIG. 4, the second storage interface 448 of FIG. 4, or a combination thereof to access the current location 204, the map information, the feedback information, the location indicator 220, or a combination thereof. The occupant module 508 can use the first control unit 412, the second control unit 434, or a combination thereof to process the current-occupancy 242, the occupant density 246, a derivative or a further result thereof, or a combination thereof. The occupant module 508 can store the processed information in the first storage unit 414, the second storage unit 446, or a combination thereof.

After processing information regarding people with respect to their locations, the control flow can pass from the occupant module 508 to the management module 510. The control flow can pass similarly as described above between the locating module 502 and the context module 504, but using processing results of the occupant module 508, such as the occupant density 246, the current-occupancy 242, the area occupancy-profile 304, the area-density function 306, or a combination thereof.

The management module 510 is configured to control one or more devices for the computing system 100 based on the occupant density 246. The management module 510 can provide a feature or information to the user 202, the members 216, or a combination thereof according to the occupant density 246 at the current time 206, estimated for the future time 214 of FIG. 2, or a combination thereof.

The management module 510 can control or implement based on the density-control profile 314 of FIG. 3. The management module 510 can generate or use the density-control profile 314 for controlling the first device 102, the second device 106, or a combination thereof based on the occupant density 246, such as for the relevant area 234 including or associated with the target source 226. The management module 510 can include a trigger module 518, a control-execution module 520, or a combination thereof for the density-control profile 314.

The trigger module 518 is configured to initiate the control or the implementation for the density-control profile 314. The trigger module 518 can determine when to control or implement the features or the notices through the devices based on the occupant density 246. For example, the trigger module 518 can calculate the density-correlated delay 310 of FIG. 3, the density-correlated estimation 312 of FIG. 3, or a combination thereof for initiating implementations for the density-control profile 314.

The trigger module 518 can calculate the density-correlated delay 310 corresponding to the target goal 224 based on the occupant density 246. The trigger module 518 can calculate the density-correlated delay 310 for obtaining or achieving the target goal 224. The trigger module 518 can calculate the density-correlated delay 310 based on the occupant density 246, the current-occupancy 242, the member location set 218, or a combination thereof for the target source 226, the relevant area 234, or a combination thereof as associated with the target goal 224.

The trigger module 518 can calculate the density-correlated delay 310 based on a delay in travel associated with the occupant density 246 in the relevant area 234. The trigger module 518 can calculate the density-correlated delay 310 to include a traffic delay for traversing through the relevant area 234 including the surrounding segment 232.

The trigger module 518 can calculate the density-correlated delay 310 using the area-density function 306 corresponding to the relevant area 234 at the future time 214 when the user 202 is scheduled to or is likely able to arrive in the relevant area 234. The trigger module 518 can calculate the entire estimated travel time, the estimated arrival time, the increase in the estimate travel time compared to other nominal times as predetermined by the computing system 100, or a combination thereof as the density-correlated delay 310 associated with traveling to the target source 226.

The trigger module 518 can calculate the density-correlated delay 310 based on the performance rate of the target source 226. The trigger module 518 can calculate the density-correlated delay 310 as the delay caused by the performance rate of the target source 226 at the projected arrival time of the user 202 at the target source 226. The trigger module 518 can calculate the delay in comparison to nominal rate of the target source 226 as predetermined by the computing system 100. The trigger module 518 can further calculate the density-correlated delay 310 as a combination of the delay associated with both the travel and the performance rate.

The trigger module 518 can calculate the density-correlated delay 310 associated with the current time 206, the future time 214, or a combination thereof. For example, the trigger module 518 can calculate the density-correlated delay 310 associated with the user 202 departing at the current time 206 to obtain or achieve the target goal 224.

Also for example, the trigger module 518 can calculate the density-correlated delay 310 associated with the user 202 departing at the future time 214 to obtain or achieve the target goal 224. The trigger module 518 can select a value or an instance of the future time 214 based on the target goal 224, the context, or a combination thereof.

As a more specific example, the trigger module 518 can select the value or the instance of the future time 214 as a threshold value for comparing the performance rate, the travel time, or a combination thereof as according to the area-density function 306. Also as a more specific example, the trigger module 518 can select the value or the instance of the future time 214 as a predetermined time or offset value as predetermined by the computing system 100 according to the target goal 224, such as 1:00 pm for after lunch-hour rush or 30 minutes after end of an event.

The trigger module 518 can utilize the historical information for travel time associated with values of the current-occupancy 242 or the current time 206 to calculate the density-correlated delay 310. The trigger module 518 can calculate the changes in duration according to various times, events, values of the current-occupancy 242, or a combination thereof for the relevant area 234.

The trigger module 518 can further use historical information for various establishments, feedback information from establishments, such as estimated wait time or a queue size, or a combination thereof to calculate the density-correlated delay 310. The trigger module 518 can include a method, a process, a mechanism, or a combination thereof predetermined by the computing system 100 for combining the various factors or information described above to calculate the density-correlated delay 310.

The trigger module 518 can similarly generate the density-correlated estimation 312. The trigger module 518 can generate the density-correlated estimation 312 for predicting the occupant density 246 for the future time 214. The trigger module 518 can utilize the historical information, the context data, the member location set 218, the current-occupancy 242, the occupant density 246, the area occupancy-profile 304, the area-density function 306, the target goal 224, or a combination thereof for the relevant area 234, the target source 226, or a combination thereof to generate the density-correlated estimation 312 similarly as described above for the density-correlated delay 310.

As a more specific example, the trigger module 518 can utilize previous records of movements, such as for recorded instances of the current location 204 at the corresponding time of the user 202 or the members 216, of crowds over a threshold size as predetermined by the density threshold 316 of FIG. 3 to generate the density-correlated estimation 312. The trigger module 518 can generate the density-correlated estimation 312 as the estimated or predicted location of a current crowd or a mob of the members 216 at the future time 214.

Also as a more specific example, the trigger module 518 can determine a pattern between changes in the occupant density 246 and distance between corresponding establishments or target sources. The trigger module 518 can calculate the density-correlated estimation 312 for a mass of the members 216 at the current time 206 as estimation or the predicted location thereof at the future time 214 fitting the trend or the pattern of changes.

The trigger module 518 can initiate the control of the device or features for the density-control profile 314 based on comparing the density-correlated estimation 312, the density-correlated delay 310, or a combination thereof with the density threshold 316. For example, the trigger module 518 notify the user 202 when the density-correlated delay 310 corresponding to the current time 206 is greater than the density threshold 316 associated with the context or the target goal 224, the density-correlated delay 310 corresponding to the future time 214 is less than the density threshold 316, or a combination thereof.

Also for example, the trigger module 518 can notify the user 202 at the estimated or predicted location of the crowd. Also for example, the trigger module 518 can reroute or determine latter-requested routes when the density-correlated delay 310 for travelling is greater the density threshold 316. Also for example, the trigger module 518 can send calculate prices and notify the members 216 of the result when the occupant density 246 according to the density-correlated delay 310, the density-correlated estimation 312, or a combination thereof is greater than the density threshold 316.

It has been discovered that the density-correlated delay 310 provides increased efficiency in time management for the user 202. The density-correlated delay 310 can accurately use the real-time location information to predict amount of delay from traveling or delay due to demand at the target source 226 for the user 202. The density-correlated delay 310 can be used by the user 202 to optimize the delay time, such as by performing another task appropriate for the delay or by minimizing the overall delay based on controlling or adjusting the schedule or actions.

It has also been discovered that the density-correlated estimation 312 provides ability to take pre-emptive actions to manage drastic changes in number of occupants. The density-correlated estimation 312 can predict flow of people based on time or events using accurate real-time data from the people. The density-correlated estimation 312 can be used to predict the demand according to time or events for various resources corresponding to the people.

The trigger module 518 can initiate the control through the control-execution module 520. The control-execution module 520 is configured to control one or more devices in the computing system 100 to implement a feature or notify a party according to the occupant density 246.

The control-execution module 520 can communicate the occupant density 246, the density-control profile 314, the density-correlated delay 310, the area-density function 306, the density-correlated delay 310, the density-correlated estimation 312, or a combination thereof between devices. For example, the control-execution module 520 can communicate between the first device 102, the second device 106, other personal device, other server, or a combination thereof. Also for example, the control-execution module 520 can use the first communication unit 416, the second communication unit 436, other communication units, or a combination thereof to communicate the density-related or occupancy-related information between devices.

The control-execution module 520 can generate the density-control profile 314 based on the occupant density 246 for controlling the first device 102, the second device 106, or a combination thereof for the user 202 according to the target goal 224 corresponding to the user 202. The control-execution module 520 can generate the density-control profile 314 for assisting the user 202 through or relative to the relevant area 234, assisting the user 202 in achieving or acquiring the target goal 224, or a combination thereof.

The control-execution module 520 can generate the density-control profile 314 including information for implementing various features, such as a command or a set of instructions. For example, the control-execution module 520 can generate the density-control profile 314 for or including the density-avoidance notice 318 of FIG. 3, the density-sensitive price 326 of FIG. 3, or a combination thereof. Also for example, the control-execution module 520 can generate the density-control profile 314 for or including a determination of the density-sensitive resource 328 of FIG. 3, the resource provider 330 of FIG. 3, the density-sensitive safety-alert 332 of FIG. 3, or a combination thereof.

Also for example, the control-execution module 520 can generate the density-control profile 314 based on calculating the density-sensitive traffic-pattern 320 of FIG. 3 for representing the one or more member 216 traversing to, from, or in the relevant area 234. The control-execution module 520 can generate the density-control profile 314 including the density-sensitive route 322 of FIG. 3, the density-sensitive traffic-adjustment 324 of FIG. 3, or a combination thereof based on the density-sensitive traffic-pattern 320.

Based on triggering information from the trigger module 518, the control-execution module 520 can generate the density-avoidance notice 318 associated with the target goal 224 for the user 202. For example, the control-execution module 520 can generate the density-avoidance notice 318 including the density-correlated delay 310 associated with the target goal 224, the future time 214 minimizing the density-correlated delay 310, or a combination thereof. Also for example, the control-execution module 520 can generate the density-avoidance notice 318 including the density-sensitive route 322 for avoiding areas with density above a predetermined threshold.

Also for example, the control-execution module 520 can generate the density-avoidance notice 318 including the occupant density 246 or the current-occupancy 242 at the surrounding area 230, event information, such as start or end time, associated with the surrounding area 230, or a combination thereof. Also for example, the control-execution module 520 can generate the density-avoidance notice 318 suggesting an alternate time for leaving or arriving, alternate location with same category, type, price, or a combination thereof, alternate route, or a combination thereof.

The control-execution module 520 can calculate the density-sensitive route 322 for the user 202 to avoid crowded roads. The control-execution module 520 can use various algorithms or mechanisms to calculate the route minimizing travel time or calculated penalties caused by the occupant density 246 along a candidate route or in establishments or structures within a predetermined distance from the candidate route.

Also for example, the control-execution module 520 can generate the density-avoidance notice 318 including the density-sensitive traffic-adjustment 324 for the members 216, the user 202, or a combination thereof for managing the occupant density 246. The control-execution module 520 can coordinate routes for a group of people.

Continuing with the example, the control-execution module 520 can calculate multiple routes for simultaneous travel, such as relative to an event or for other travelers unaware of traffic situation. The control-execution module 520 can calculate density-sensitive traffic-adjustment 324 including the multiple routes for distributing the vehicles across paths, avoiding overcrowding on the surrounding segment 232, optimizing overall travel time for the group of people, or a combination thereof.

The control-execution module 520 can further generate the density-control profile 314 for or including the density-sensitive price 326. The control-execution module 520 can calculate the density-sensitive price 326 based on the occupant density 246. The control-execution module 520 can calculate the density-sensitive price 326 based on the occupant density 246 at the current time 206, estimated or predicted for the future time 214, or a combination thereof.

The control-execution module 520 can calculate the density-sensitive price 326 based on setting or adjusting a price for the target goal 224 based on the occupant density 246 at the current time 206, estimated or predicted for the future time 214 using the area-density function 306, or a combination thereof. For example, the control-execution module 520 can set or adjust the pricing for the density-sensitive price 326 for attracting more people using the density-sensitive price 326. Also for example, the control-execution module 520 can calculate the density-sensitive price 326 for dynamic or the occupant density 246 based discount or promotion.

The control-execution module 520 can analyze, access, use, or a combination thereof for patterns between pricing and the occupant density 246. The control-execution module 520 can further utilize a method, an equation, a process, or a combination thereof predetermined by the computing system 100 for describing the relationship between demand or popularity and pricing to calculate the density-sensitive price 326 based on the occupant density 246.

The control-execution module 520 can communicate the density-sensitive price 326 to the user 202, the members 216, or a combination thereof. The control-execution module 520 can communicate the density-sensitive price 326 as a commercial, an offer, an advertisement, a promotion, or a combination thereof.

The control-execution module 520 can further determine the user 202 or the members 216 accepting the density-sensitive price 326 or the associated promotion, arriving at the target source 226 within a predetermined amount of time in response to the density-sensitive price 326, or a combination thereof for implementing or qualifying to use the density-sensitive price 326. For example, the control-execution module 520 can allow the user 202 or the member 216 to lock in or accept the density-sensitive price 326 based on replying to the communication, confirming or requesting a route to the target source 226, arriving at the target source 226 or responding to the communication within a period of time, or a combination thereof.

The control-execution module 520 can further communicate the density-sensitive price 326 to the user 202 or the target source 226 for implementing the density-sensitive price 326 to attract more patrons. The control-execution module 520 can notify the price, the time, the duration, or a combination thereof for best attracting customers or patrons. The control-execution module 520 can further communicate or manage the members 216 responding to the density-sensitive price 326 for the target source 226 for aiding or implementing or applying the density-sensitive price 326.

The control-execution module 520 can further generate the density-control profile 314 for or including the density-sensitive resource 328, the resource provider 330, or a combination thereof. The control-execution module 520 can determine the density-sensitive resource 328 based on associations between goods, services, situations, contexts, historical records, or a combination thereof.

The control-execution module 520 can determine the density-sensitive resource 328 as a good, a service, or a combination thereof associated with the target goal 224. The control-execution module 520 can determine a pattern between the goods, the services, or a combination thereof based on pattern recognition or machine-learning mechanism using historical record or other available data. The control-execution module 520 can determine the density-sensitive resource 328 as the good, the service, or a combination thereof needed or necessary concurrently with, before, after, or a combination thereof relative to the target goal 224.

For example, the control-execution module 520 can determine the density-sensitive resource 328 as transportation, safety, provider or vendor, delivery service, or a combination thereof. As a more specific example, the control-execution module 520 can determine the density-sensitive resource 328 as a taxi service, public service or emergency service, part or ingredient supplier or delivery service, or a combination thereof.

The control-execution module 520 can further generate the density-control profile 314 for or including the density-sensitive safety-alert 332. The control-execution module 520 can generate the density-control profile 314 based on the density-correlated estimation 312 for predicting the occupant density 246 for the future time 214.

The control-execution module 520 can generate the density-sensitive safety-alert 332 as a warning or a notice to the target source 226 corresponding to the estimated location for the density-correlated estimation 312. The control-execution module 520 can generate the density-sensitive safety-alert 332 warning or a notice to the target source 226 for informing the resource provider 330, such as the public safety entity or an emergency service, regarding the estimated location for the density-correlated estimation 312, estimation of the occupant density 246 at the future time 214 or at the current time 206, or a combination thereof.

The control-execution module 520 can determine the resource provider 330 for the density-sensitive safety-alert 332, the density-sensitive resource 328, or a combination thereof. The control-execution module 520 can determine the resource provider 330 according to the density-sensitive resource 328, the estimated location for the density-correlated estimation 312, estimation of the occupant density 246 at the future time 214, or a combination thereof.

The control-execution module 520 can determine the resource provider 330 based on dynamically searching according to the density-sensitive resource 328, the estimated location, the estimated size, or a combination thereof. The control-execution module 520 can further determine the resource provider 330 based on matching the density-sensitive resource 328, the estimated location, the estimated size, or a combination thereof using a set of information predetermined by the computing system 100.

The management module 510 can use the first communication unit 416, the second communication unit 436, or a combination thereof to communicate information with the first device 102, the second device 106, the user 202, the members 216, the resource provider 330, the target source 226, or a combination thereof. The management module 510 can further use the first user interface 418, the second user interface 438, or a combination thereof to communicate information to a person through a device. The management module 510 can communicate between devices, between a device and a person, or a combination thereof for implementing the density-control profile 314.

The management module 510 can further use the first control unit 412, the second control unit 434, or a combination thereof to process the density-control profile 314. The management module 510 can further store the density-control profile 314, processing result for the density-control profile 314, or a combination thereof in the first storage unit 414, the second storage unit 446, or a combination thereof.

The control flow can pass to the locating module 502. The computing system 100 can further determine changes or updates in location or behavior for the user 202, the members 216, or a combination thereof in response to implementing the density-control profile 314. The computing system 100 can further determine the location indicator 220 from other users updating responses to implementing the density-control profile 314. For example, the computing system 100 can determine news feed, blog updates, tweets, personnel communications, or a combination thereof associated with implementing the density-control profile 314 to update the location indicator 220 for the user 202, the members 216, or a combination thereof.

It has been discovered that the density-control profile 314 provides increased density-based benefits. The density-control profile 314 can be used to increase occupancy or number of patrons for providers, which can provide improved pricing to the patrons or the customers. The density-control profile 314 can further be used to attract the users to popular areas with high density or avoid high density areas for convenience.

It has also been discovered that the density-sensitive price 326 provides discounted prices for the target goal 224 and increased profits for the providers. The density-sensitive price 326 can be calculated and set to provide lower pricing for the target goal 224 for the user 202, the members 216, or a combination thereof. The density-sensitive price 326 can further be set or calculated to attract more customers or patrons for the target source 226.

It has also been discovered that the density-sensitive resource 328 and the resource provider 330 provide efficiency and maximization of opportunities. The density-sensitive resource 328 can be used to determine goods or services that would be necessary or demanded for a large group of people. The information can be communicated to the resource provider 330 for earlier preparations and for maximizing opportunities.

It has also been discovered that the density-sensitive traffic-adjustment 324 provides increased overall efficiency for a group of users for the computing system 100. The computing system 100 can use the density-sensitive traffic-adjustment 324 to guide multiple users to provide overall benefit. The computing system 100 can coordinate travel or guidance for large amounts of users such as indicated by the occupant density 246.

The modules described in this application can be hardware implementation or hardware accelerators, including passive circuitry, active circuitry, or both, in the first storage unit 414, the second storage unit 446, the first control unit 416, the second control unit 438, or a combination thereof. The modules can also be hardware implementation or hardware accelerators, including passive circuitry, active circuitry, or both, within the first device 102, the second device 106 of FIG. 1, or a combination thereof but outside of the first storage unit 414, the second storage unit 446, the first control unit 416, the second control unit 438, or a combination thereof.

The computing system 100 has been described with module functions or order as an example. The computing system 100 can partition the modules differently or order the modules differently. For example, the count module 512, the density module 514, or a combination thereof can be included in the locating module 502 and determine the current-occupancy 242 or the occupant density 246 for each structure, entity, boundary, or a combination thereof included in map information. Also for example, the computing system 100 can include the area module 506 inside the occupant module 508 to determine the relevant area 234 based on the occupant density 246 of a smaller area or a structure within the surrounding area 230.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 414, the second storage unit 446, or a combination thereof can represent the non-transitory computer readable medium. The first storage unit 414, the second storage unit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the occupant density 246, the density-control profile 314, or a combination thereof results in the movement in the physical world, such as content displayed or recreated for the user on one or more of the devices or physical displacement of the user 202 carrying the first device 102. Movement in the physical world results in updates to the location indicator 220 or the current location 204, which can be fed back into the computing system 100 and further influence the occupant density 246.

Figure 6:
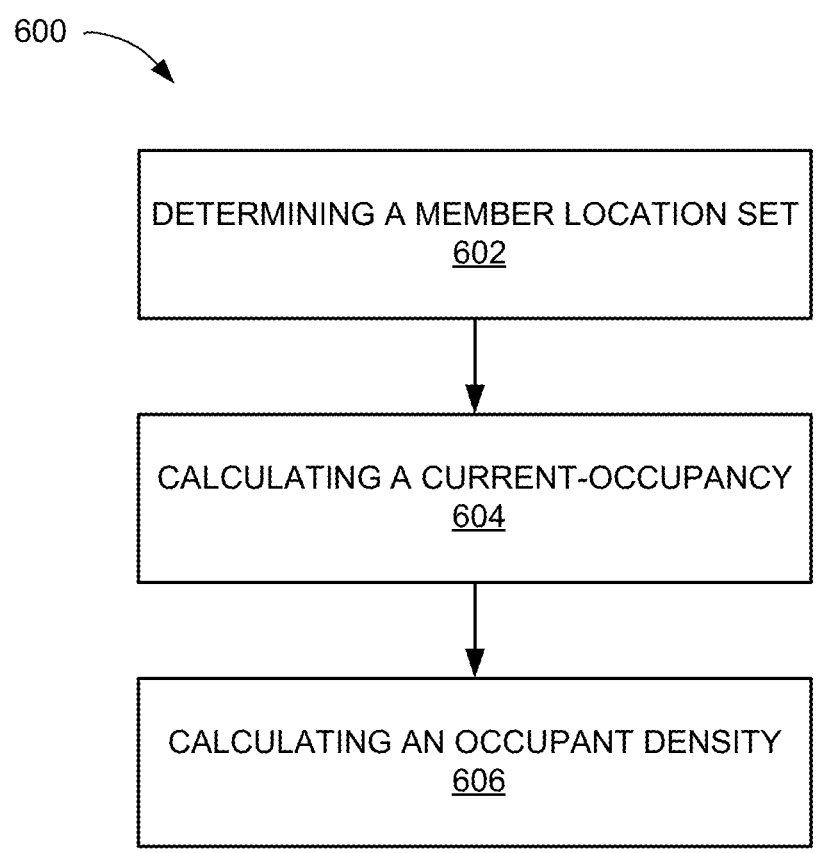
FIG. 6 is a flow chart of a method of operation of a computing system in an embodiment of the present invention.

Referring now to FIG. 6, therein is shown a flow chart of a method 600 of operation of a computing system 100 in an embodiment of the present invention. The method 600 includes: determining a member location set for representing one or more member in a block 602; calculating a current-occupancy based on the member location set for representing the one or more member located at a relevant area in a block 604; and calculating an occupant density based on the current-occupancy with a control unit for representing the occupant density corresponding to the relevant area in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a computing system comprising:
    determining a member location set based on one or more pictures within a user-provided content though a social media for representing one or more members, wherein the members include one or more persons;
    calculating a current-occupancy based on the member location set for representing the one or more members located at a relevant area;
    calculating an occupant density based on the current-occupancy for representing the occupant density corresponding to the relevant area;
    generating a density-correlated estimation based on the occupant density for predicting the occupant density for a later time;
    generating a density-sensitivity safety-alert based on the density-correlated estimation for notifying a public safety entity, an enforcement agency, or a combination thereof of safety issues related to the occupant density at a future time; and
    notifying, with a communication unit, the public safety entity, the enforcement agency, or a combination thereof with the density-sensitivity safety-alert at the future time.

2. The method as claimed in claim 1 wherein calculating the occupant density includes calculating the occupant density based on the current-occupancy and an area boundary for representing the relevant area.

3. The method as claimed in claim 1 further comprising generating an area-density function based on the occupant density for representing the occupant density for the relevant area based on time.

4. The method as claimed in claim 1 further comprising:
    determining a target goal for the public safety entity, the enforcement agency, or a combination thereof; and
    calculating a density-correlated delay corresponding to the target goal.

5. The method as claimed in claim 1 wherein calculating the current-occupancy includes calculating the current-occupancy based on an occupancy duration for representing the one or more members at the relevant area.

6. The method as claimed in claim 1 further comprising:
    determining a target goal for the public safety entity, the enforcement agency, or a combination thereof;
    determining the relevant area corresponding to the target goal; and
    generating a density-control profile based on the occupant density for controlling a device for the public safety entity, the enforcement agency, or a combination thereof according to the target goal.

7. The method as claimed in claim 1 further comprising generating a density-avoidance notice, including a density-sensitive route for avoiding areas with density above a predetermined threshold.

8. The method as claimed in claim 1 further comprising determining a density-sensitive resource based on the occupant density for representing the density-sensitive resource necessary for a target goal for the public safety entity, the enforcement agency, or a combination thereof.

9. The method as claimed in claim 1 wherein determining the member location set includes determining the member location set based on one or more of an email, a text, a schedule calendar, a transaction record, or a social media.

10. A computing system comprising:
    a control unit configured to:
    determine a member location set based on one or more pictures within a user-provided content though a social media for representing one or more members, wherein the members include one or more persons,
    calculate a current-occupancy based on the member location set for representing the one or more members located at a relevant area,
    calculate an occupant density based on the current-occupancy for representing the occupant density corresponding to the relevant area,
    generate a density-correlated estimation based on the occupant density for predicting the occupant density for a later time,
    generate a density-sensitivity safety-alert based on the density-correlated estimation for notifying a public safety entity, an enforcement agency, or a combination thereof of safety issues related to the occupant density at a future time; and
    a communication unit, coupled to the control unit, configured to communicate a location indicator for representing one or more members, and to communicate the density-sensitivity safety-alert at a future time to the public safety entity, the enforcement agency, or a combination thereof.

11. The system as claimed in claim 10 wherein the control unit is configured to calculate the occupant density based on the current-occupancy and an area boundary for representing the relevant area.

12. The system as claimed in claim 10 wherein the control unit is configured to generate the area-density function based on the occupant density for representing the occupant density for the relevant area based on time.

13. The system as claimed in claim 10 wherein the control unit is configured to:
determine a target goal for the public safety entity, the enforcement agency, or a combination thereof; and
calculate a density-correlated delay corresponding to the target goal.

14. The system as claimed in claim 10 wherein the control unit is configured to calculate the current-occupancy including calculating the current-occupancy based on an occupancy duration for representing the one or more members at the relevant area.

15. A non-transitory computer readable medium including instructions for a computing system comprising:
determining a member location set based on one or more pictures within a user-provided content though a social media for representing one or more members, wherein the members include one or more persons;
calculating a current-occupancy based on the member location set for representing the one or more members located at a relevant area;
calculating an occupant density based on the current-occupancy for representing the occupant density corresponding to the relevant area;
generating a density-correlated estimation based on the occupant density for predicting the occupant density for a later time;
generating a density-sensitivity safety-alert based on the density-correlated estimation for notifying a public safety entity, an enforcement agency, or a combination thereof, of safety issues related to the occupant density at a future time; and
notifying to the public safety entity, the enforcement agency, or a combination thereof the density-sensitivity safety-alert at a future time.

16. The non-transitory computer readable medium as claimed in claim 15 wherein calculating the occupant density includes calculating the occupant density based on the current-occupancy and an area boundary for representing the relevant area.

17. The non-transitory computer readable medium as claimed in claim 15 further comprising generating an area-density function based on the occupant density for representing the occupant density for the relevant area based on time.

18. The non-transitory computer readable medium as claimed in claim 15 further comprising:
determining a target goal for the public safety entity, the enforcement agency, or a combination thereof; and
calculating a density-correlated delay corresponding to the target goal.

19. The non-transitory computer readable medium as claimed in claim 15 wherein calculating the current-occupancy includes calculating the current-occupancy based on an occupancy duration for representing the one or more members at the relevant area.

* * * * *